OR 3,883,220

United States Patent
Taylor

[11] 3,883,220
[45] May 13, 1975

[54] OPTICAL SWITCH
[75] Inventor: Henry F. Taylor, San Diego, Calif.
[73] Assignee: The United States of America as represented by the Secretary of the Navy, Washington, D.C.
[22] Filed: Dec. 10, 1973
[21] Appl. No.: 423,624

[52] U.S. Cl. ....... 350/96 WG; 350/96 C; 350/160 R
[51] Int. Cl. .............................................. G02b 5/14
[58] Field of Search ......... 350/96 WG, 96 C, 160 R

[56] References Cited
UNITED STATES PATENTS

| | | | |
|---|---|---|---|
| 3,386,787 | 6/1968 | Kaplan | 350/96 WG |
| 3,465,159 | 9/1969 | Stern | 350/96 WG |
| 3,695,745 | 10/1972 | Furukawa | 350/96 WG |
| 3,736,045 | 5/1973 | Heidrich et al. | 350/96 WG |
| 3,795,433 | 3/1974 | Channin | 350/96 WG |
| 3,802,760 | 4/1974 | Sosnowski | 350/96 WG |

Primary Examiner—John K. Corbin
Attorney, Agent, or Firm—R. S. Sciascia; G. J. Rubens; J. W. McLaren

[57] ABSTRACT

An optical switch comprises a substrate having a first refractive index and supporting electro-optic material having a second higher refractive index and defining waveguides which diverge into at least two spatially separated paths. A pair of electrodes is positioned proximate each of the spatially separated paths and when a source of electrical energy is applied to a selected pair of electrodes, an electric field is created across the associated spatially separated path which substantially lowers its refractive index and thereby diverts or switches optical energy from that path.

5 Claims, 9 Drawing Figures

PATENTED MAY 13 1975  3,883,220
 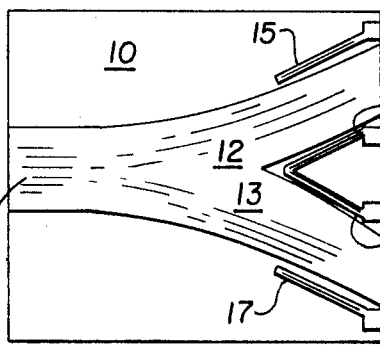 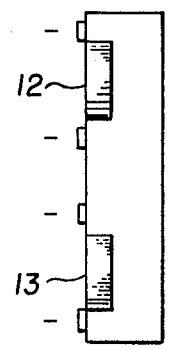
FIG. 1a  FIG. 1  FIG. 1b
 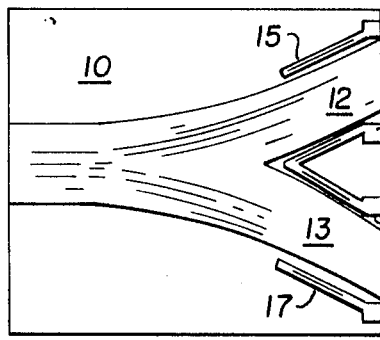 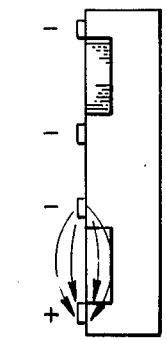
FIG. 2a  FIG. 2  FIG. 2b
 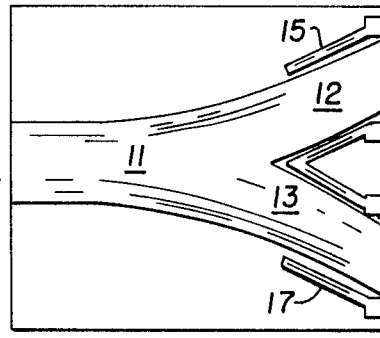 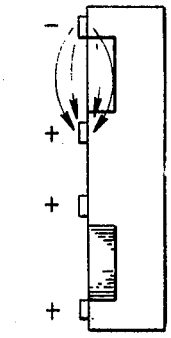
FIG. 3a  FIG. 3  FIG. 3b

OPTICAL SWITCH

BACKGROUND OF THE INVENTION

The primary purpose of the present invention is to switch light energy, usually in the form of a light beam, from one path to another. In prior art practices, switching of light energy from one path to another was achieved in a number of different ways. These prior art techniques included, among others, the mechanical motion of a deflecting mirror positioned to intercept and redirect the light energy of a beam, or the employment of the interaction of light with acoustic energy in a medium of suitable material. Unfortunately, many of the prior art systems, practices, and techniques inherently incurred disadvantages which could not be readily eliminated or corrected. Such disadvantages of prior art techniques included the fact that many involved the use of optical elements which, though only of the dimensions of centimeters, were nonetheless relatively large for many applications on the forefront of the current development of electro-optical technologies.

Additionally, where such mechanically positioned optical elements are involved, their actuation is undesirably slow, resulting in commensurately slow switching times of the order of 1 to 100 microseconds. Moreover, many of the prior art techniques and practices require comparatively large electrical power inputs detracting from their desirability in advanced optical systems.

As an added disadvantage, many of the prior art devices and techniques involved components and combinations which were of relatively large size in a physical sense, rendering them less desirable and compatible with present trends toward miniaturization of systems. Yet other prior art techniques for optical switching were inherently restricted to operation within very limited wavelength ranges of optical energy.

Accordingly, a need exists for an optical switch which is small in size, highly reliable, capable of operating at extremely high switching speeds over a broad spectral range of wavelengths, has low power requirements in terms of electrical energy.

SUMMARY OF THE INVENTION

The present invention comprises an optical switch which is operative to switch the light beam from one path to another by instantaneously changing the refractive index of a solid or liquid medium in such a way as to favor the propagation of light energy along a desired path. In its simplest and most fundamental form the switch of the present invention may comprise an optical waveguide which diverges or branches into at least two spatially separated paths. In accordance with the concept of the present invention, it is possible to controllably switch any of several paths to waveguiding or non-waveguiding operation by appropriately and selectively changing the refractive index of the optical paths.

In the context of the present invention, "waveguiding" operation is intended to define an optical path which has a refractive index greater than that of its surrounding medium; "non-waveguiding" operation is intended to connote that the refractive index of an optical path is lower than or equal to that of its surrounding medium.

In accordance with the concept and teaching of the present invention an optical switch may comprise a substrate having a first refractive index and supporting broadband optical waveguides defined by an electro-optic material on predetermined portions of the substrate, the electro-optic material having a second refractive index which is higher than the first refractive index.

The material of the second higher refractive index, which defines the broadband optical waveguides, diverges into at least two spatially separated paths so as to provide at least two alternate directions for the propagation of light energy. A pair of electrodes is provided and positioned proximate to and operatively associated with each spatially separated path. Each pair of electrodes is so disposed and positioned relative to an individual associated spatially separated path that it is capable of creating an electro-static field across that associated spatially separated path.

A source of electrical energy is provided together with appropriate means for controllably connecting the electric voltage to a selected pair or pairs of electrodes to apply an electrostatic field across the respectively associated spatially separated path for substantially lowering its refractive index. The result is that the substantially lowered refractive index instantaneously operates upon the electro-optic material of that spatially separated path to which the electro-static field is applied to render it "non-waveguiding," since, in accordance with the concept of the present invention, the refractive index is lowered at least equal the refractive index of the surrounding medium.

Accordingly, it is a primary object of the present invention to provide a significantly improved optical switch.

An equally important object of the present invention is to provide an optical switch capable of operation through an extremely broad spectrum of wavelengths of optical energy.

An ancillary object of the present invention is to provide an improved optical switch which may be fabricated in extremely small embodiments.

A further object of the present invention is to provide such an improved optical switch which is capable of extremely high speed operation.

Another object of the inventive concept is to provide a device which operates by the application of a voltage across a high-impedance load, such load being the electro-optic material of the device itself.

Yet another most important object of the present invention is to provide an improved optical switch that is highly efficient and requires minimal power for its operation.

A concomitant object of the present invention is to provide an improved optical switch which, in addition to the foregoing desirable attributes, is also entirely and inherently solid state in nature.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIGS. 1, 1A and 1B; FIG. 2, 2A and 2B; and FIG. 3, 3A and 3B are illustrations of a preferred embodiment of the present invention.

DESCRIPTION OF THE PREFERRED EMBODIMENTS

FIG. 1 is a top view of a preferred embodiment of the present invention and comprises a substrate 10 of a first refractive index having supported thereon broadband optical waveguides defined by an electro-optic material of a second higher refractive index diverging from a single waveguide path 11 into two spatially separated paths 12 and 13.

A pair of electrodes 14 and 15 is positioned proximate to, and operatively associated with, the optical path 12. Similarly, a second pair of electrodes 16 and 17 is positioned proximate to, and operatively associated with, the optical path 13. A source of electrical energy represented by the battery 18 is arranged to by connectable to the previously described electrodes by two switches 19 and 20.

FIG. 1A is an end view of the substrate and broadband optical waveguide cross-sectionally illustrating the single waveguide 11.

FIG. 1B is an end view of the opposite end of the substrate and its waveguides supported thereon crosssectionally illustrating the two spatially separated optical paths 12 and 13 supported on the substrate 10.

In the illustration of FIG. 1, switch 19 is connected to ground and as also is switch 20; the result is that the electrodes 14 and 15 associated with the optical path 12, as well as electrodes 16 and 17 associated with the optical path 13, are all at ground potential. Thus, there is no electric field created across either the optical path 12 or 13 and they behave in the manner of an optical waveguide functioning substantially as a beam splitter. That is to say, that light entering upon the single path portion 11 of the device as indicated by the arrows splits off into two paths 12 and 13 so that substantially equal amounts of light emerge from the spatially separated optical paths 12 and 13 as shown by the arrows. Consistent with the condition illustrated in FIG. 1, it should be noted that FIG. 1B shows no electric field existing across the respective pairs of electrodes, each associated with one of the two spatially separated optical paths 12 and 13.

In FIG. 2 switch 20 is shown in its alternate position where it is disconnected from ground and connected to the high potential side of a source of electrical energy in the form of battery 18. As a consequence electrode 17 receives a high potential while electrode 16 is at ground potential; thus, an electric field is applied across the optical path 13 substantially lowering its refractive index by changing it to at least the level of refractive index of the substrate 10. The optical path 13 therefore does not behave in the manner of an optical waveguide and is switched off in that it ceases to pass light energy.

However, in the condition illustrated in FIG. 2, the electrodes 14 and 15, which are proximate to and operatively associated with the optical path 12, are both at ground level potential. Therefore there is no electric field applied to the optical path 12 and it continues to operate in the manner of an optical waveguide transmitting light energy therethrough as shown by the arrows.

Thus, in the condition illustrated in FIG. 2 light energy entering the single path optical waveguide 11 as indicated by the arrows is transmitted through the optical path 12 but not through the optical path 13 and accordingly the light energy may be selectively switched in the manner illustrated.

FIG. 2A illustrates that there is no change produced in the condition of the single optical waveguide portion 11, while FIG. 2B illustrates that an electric field has been impressed across the optical path 13 by reason of the potential developed between electrodes 16 and 17.

It is important to note that the electro-optic material constitutes a relatively very high impedance path so that in a practical sense there is virtually no current flow between the energized electrodes so that the concept of the present invention inherently provides operation requiring minimal power.

FIG. 3 illustrates a further alternative condition of the switch of the present invention in which both the switches 19 and 20 are connected to the positive potential of the source of electrical energy in the form of battery 18.

In the switching arrangement illustrated in FIG. 3, the electrodes 16 and 17, which are proximate to and operatively associated with the optical path 13, are both at a positive potential and therefore no electric field is created across the optical path 13. As a consequence the refractive index of optical path 13 remains unchanged and it will transmit light energy in the manner of an optical waveguide as indicated by the arrows.

However, under the switching conditions illustrated in FIG. 3, the electrode 14 is at a positive potential while the electrode 15 is at ground potential and as a result an electric field is created thereacross changing the refractive index of the optical path 12 to equal or lower than the refractive index of its supporting substrate material 10.

The described change in the refractive index causes the optical path 12 to cease operation in the manner of an optical waveguide and thus optical energy received in the device as shown by the arrows and passing from the single optical path 11 is diverted away from the optical path 12 and follows only the optical path 13 as indicated by the arrows. Therefore, the optical switching function which is the alternative to that illustrated in FIG. 2, may be readily selectively affected by the electrical connections as illustrated in FIG. 3.

FIG. 3A illustrates that there is no change in the single optical waveguide path 11, while FIG. 3B illustrates that an electric field has been created and impressed across the optical path 12 by reason of the indicated difference of potential of its associated electrodes 14 and 15. The electrodes 16 and 17 associated with the optical path 13, however, are both at a positive potential so that no electric field is created thereacross and the functional condition of optical path 13 remains unchanged.

Many variations, possibilities, and choices of suitable materials are available to implement the concept and the teaching of the present invention. For example, the substrate material may comprise gallium arsenide while the optical waveguide portions may be comprised of proton-implanted gallium arsenide.

An alternative selection of materials is provided by a substrate of zinc selenide having optical waveguide portions defined by cadmium diffused into the zinc selenide substrate.

A further alternative in the choice of material affords the use of liquid crystals having a very high electro-optic coefficient such as nitro-benzene, for example, which are contained within grooves or channels in plastic or glass so that the plastic or glass provides the substrate and the liquid crystals provide and define the optical waveguides. Numerous other suitable transparent electro-optic materials may be employed as conceived and taught by the present invention. Some of these materials are cadmium sulphide, zinc sulphide, barium titinate, and lithium niobate.

One of the more significant advantages of the present invention is the fact that is is conceived so as to operate at any wavelength of optical energy within the range of the transparency of the material employed. For example, where lithium niobate is employed as a substrate and is diffused with strontium to form and define the optical waveguides, the switch of the present invention is operative to perform optical switching at wavelengths ranging from 4,000 to 50,000A.

Thus, the limitations of range of operation of the present invention are determined by a choice of materials having suitably high electro-optic coefficients and providing transparency at the desired range of wavelengths. This inherent feature of the present invention affords greatly extended spectral range of operation as contrasted to the prior art, as well as a broad latitude of choices to implement its concept for operation within many widely diverse spectral ranges.

Those knowledgeable in the pertinent arts will readily appreciate that this disclosure and teaching of the present invention includes schematic representations which, in the interest of clarity of explanation, are not exact pictorial representations of actual embodiments of the inventive concept nor should the illustrative drawings be interpreted in a specifically limiting sense.

For example, the schematically shown switches may take the preferred form of solid-state electronically actuated and controlled switch means. Furthermore, the dimensions of substrate, waveguides, and degree of penetration of diffused materials is not shown to exact scale and may vary considerably in implementing the concept of the present invention according to specific choices and combinations of elements, materials, and components, as well as the nature of each different application of the teaching of the present invention.

Obviously many modifications and variations of the present invention are possible in the light of the above teachings. It is therefore to be understood that within the scope of the appended claims the invention may be practiced otherwise than as specifically described.

What is claimed is:

1. An optical switch comprising:
a substrate having a first refractive index;
broadband optical waveguides defined by an electrooptic material supported on predetermined portions of said substrate,
said material having a second higher refractive index and diverging from a single path into at least two spatially separated paths;
a source of electrical energy;
a pair of electrodes positioned proximate to and operatively associated with each said spatially separated path; and
means for controllably connecting said electrical energy to a selected pair of said electrodes to apply an electric field of determinable polarity across an associated spatially separated path and substantially parallel to the plane of the interface between said electrooptic material and said substrate for lowering the refractive index of said path, whereby to divert optical energy from said associated spatially separated path.

2. An optical switch as claimed in claim 1 wherein said substrate is glass and said electro-optic material is liquid crystals contained in grooves in said glass.

3. An optical switch as claimed in claim 1 wherein said substrate is gallium arsenide and said electro-optic material is proton implanted gallium arsenide.

4. An optical swtich as claimed in claim 1 wherein said substrate is zinc selenide and said electrooptic material is cadmium diffused into said zinc selenide.

5. An optical switch as claimed in claim 1 wherein said substrate is lithium niobate and said electro-optic material is strontium diffused into said lithium niobate.

* * * * *